No. 613,461.  
A. H. MUUS.
FLOOR AND CEILING PLATE.
(Application filed Jan. 8, 1898.)

Patented Nov. 1, 1898.

(No Model.)

Witnesses

Inventor
Arthur H. Muus.
By James Shepard.
Atty.

UNITED STATES PATENT OFFICE.

ARTHUR H. MUUS, OF SOUTHINGTON, CONNECTICUT, ASSIGNOR TO THE BEATON & CORBIN MANUFACTURING COMPANY, OF SAME PLACE.

FLOOR AND CEILING PLATE.

SPECIFICATION forming part of Letters Patent No. 613,461, dated November 1, 1898.

Application filed January 8, 1898. Serial No. 666,116. (No model.)

*To all whom it may concern:*

Be it known that I, ARTHUR H. MUUS, a citizen of the United States, residing at Southington, in the county of Hartford and State of Connecticut, have invented certain new and useful Improvements in Floor and Ceiling Plates, of which the following is a specification.

My invention relates to improvements in floor and ceiling plates; and the objects of my improvement are simplicity and economy in construction and efficiency in use, particularly with reference to the manner of securing the springs and in having the springs bear upon the pipe at four points.

Figure 1:
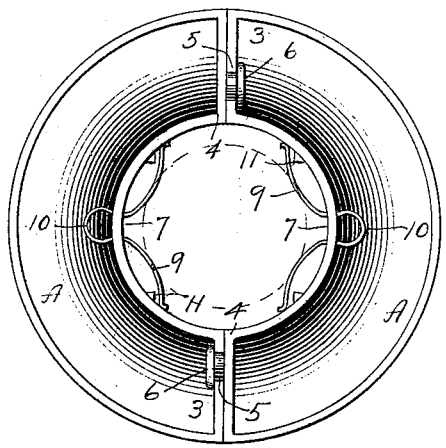
Figure 2:
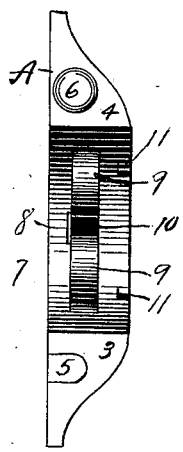

In the accompanying drawings, Figure 1 is a plan view of my plate, showing its inner side; and Fig. 2 is an edge view of one part of my plate, showing the inner edge.

A A designate the two parts of the plate, the general form of the plate being like those now in common use. The meeting ends of the said two parts are provided with walls or flanges 3 4, the wall 3 having an open slot or recess 5 and the wall 4 having a headed projection 6 extending from its face, the space between the head of said projection 6 and the said wall 4 being such as to admit the wall 3 and permit the body of said projection to enter the slot or recess 5, as shown. The inner edge of each part A is provided with the ordinary flange or rim 7, which I perforate with an angular orifice 8.

The springs 9 are doubled upon themselves at their middle portion to form a shank 10 of two thicknesses, and from said shank they are bent to either side, so as to rest on the inner side of the flange or rim 7, the ends preferably being slightly curved outwardly, as shown. The springs are secured by merely forcing their double shank through the orifice in the flange or rim 7, as shown. The inner face of the flange or rim 7 may be provided with the usual centering ribs or projections 11, but instead of having said ribs extend the whole width of the flange or rim 7, as in ordinary ceiling-plates, I make them short and preferably locate them near the face side of the plate, as shown, so that the ends of the springs may not engage therewith. By this construction of the springs they are cheaply and firmly secured in place, and they bear with a convex face at four distinct points on the pipe represented by the broken circle in Fig. 1, whereby the springs will center the plate upon pipes of varying sizes. The said springs also exert a tendency to force the two parts of the plate away from each other, whereby they will hold the said plates against accidental unfastening.

Both parts of the plates are of the same form and construction. They are assembled by first slipping one of the headed projections into one of the recesses on one side of the plate and then swinging the two parts on each other as on a hinge to engage the other one of the projections in the other recess, taking care when assembling them around a pipe to press the parts together against the force of the springs. When thus assembled on a pipe, the plate may be slipped lengthwise thereof to bring the plate to its seat.

While the particular devices herein shown and described for attaching the two parts of the plate together are well adapted to the form of spring shown, the springs formed and secured as shown may be used in connection with any other fastening devices for the two parts that will prevent the said parts from being separated under the influence of the springs on the pipe.

It is apparent that some changes from the specific construction herein disclosed may be made, and therefore I do not wish to be understood as limiting myself to the precise form of construction shown and described, but desire the liberty to make such changes in working my invention as may fairly come within the spirit and scope of the same.

I claim as my invention—

1. A two-part floor and ceiling plate having the inner flange or rim perforated as described and a spring doubled upon itself with its double shank secured in said rim and its outer ends extended to either side of said shank with its convex sides facing the center, substantially as described.

2. A two-part floor and ceiling plate having at its ends the headed projections and slotted wall for securing said parts together and holding them against diametrical detachment and the double-armed springs at the inner edge of said two parts with their ends resting on said inner edge, while the middle portion of said arms may press upon the inclosed pipe with a tendency to force the two parts of the plate away from each other and impart friction on the said headed projections for preventing said fastenings from slipping, substantially as described.

ARTHUR H. MUUS.

Witnesses:
JAMES V. JOHNSON,
DYSON HEMINGWAY.